United States Patent
Jensen et al.

(12) 
(10) Patent No.: US 6,375,230 B1
(45) Date of Patent: Apr. 23, 2002

(54) APPARATUS AND METHODS FOR PRECLUDING SEPARATION OF A THERMAL SLEEVE AND ELBOW JOINT IN THE RECIRCULATION SYSTEM OF A NUCLEAR REACTOR

(75) Inventors: Grant C. Jensen, Morgan Hill; Siamak Bourbour, San Jose; Jeffrey L. Thompson, San Jose; Arunachalam Mahadevan, San Jose, all of CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/444,408

(22) Filed: Nov. 22, 1999

(51) Int. Cl.[7] ................................................ F16L 19/08
(52) U.S. Cl. ...................... 285/104; 285/15; 285/135.2; 285/139.1; 285/140.1; 285/148.5; 285/148.26; 285/180; 285/197; 285/205; 285/338; 285/382; 376/203; 376/204; 376/361; 403/11
(58) Field of Search ................................. 376/203, 204, 376/361; 403/11; 285/15, 104, 135.2, 139.1, 140.1, 148.5, 148.26, 180, 197, 205, 338, 382

(56) References Cited

U.S. PATENT DOCUMENTS

| | | | | |
|---|---|---|---|---|
| 3,550,638 A | * | 12/1970 | Smith | ........................ 138/99 |
| 4,927,181 A | * | 5/1990 | Ciotola | ........................ 285/15 |
| 5,785,361 A | | 7/1998 | Bourbour | ..................... 285/382 |
| 5,876,146 A | | 3/1999 | Deaver et al. | ................. 403/11 |
| 6,108,391 A | * | 8/2000 | Deaver et al. | .............. 376/262 |
| 6,236,700 B1 | * | 5/2001 | Erbes et al. | ................. 376/260 |

* cited by examiner

Primary Examiner—Michael J. Carone
Assistant Examiner—John Richardson
(74) Attorney, Agent, or Firm—Nixon & Vanderhye

(57) ABSTRACT

A clamp assembly prevents separation of a thermal sleeve penetrating a nuclear reactor pressure vessel wall and a jet pump riser elbow welded one to the other and lying within an annular space between the pressure vessel wall and core shroud. The clamp assembly includes a pair of heads having semi-cylindrical recesses. Pins project inwardly from each of the heads in the semi-cylindrical recesses and have axes which lie parallel to one another. By using actuators mounting multiple electrodes, holes may be formed in situ in the adjoining ends of the thermal sleeve and elbow. Once the holes are formed, the heads can be applied in situ with the pins being received through the holes and the heads clamped to one another. Thug, the pins in each of the sleeve and elbow prevent separating movement of the sleeve and elbow in the event of failure of the welded joint therebetween.

17 Claims, 4 Drawing Sheets

APPARATUS AND METHODS FOR PRECLUDING SEPARATION OF A THERMAL SLEEVE AND ELBOW JOINT IN THE RECIRCULATION SYSTEM OF A NUCLEAR REACTOR

BACKGROUND OF THE INVENTION

The present invention relates to apparatus and methods for preventing the separation of the welded joint between a thermal sleeve and an elbow forming part of a water recirculation system in a nuclear reactor and particularly relates to apparatus and methods for clamping the sleeve and elbow to one another in situ whereby, should the welded joint fail, the sleeve and elbow are prevented from separating.

In a boiling water nuclear reactor, an annular space is defined between the core shroud and the reactor pressure vessel wall. Jet pumps are located in the annular space for recirculating water in the reactor. Typically, a substantial number of jet pumps, for example, on the order of twenty, are installed in this annular space. Each jet pump comprises a riser, a transition piece adjacent the top of the pump, a pair of nozzles, a pair of inlet mixers, a pair of diffusers and riser bracing. The inlet riser is connected to an elbow in the annular space. The opposite end of the elbow is welded to the end of a thermal sleeve which penetrates the reactor pressure vessel wall and supplies water for recirculation through the reactor via a jet pump. The weld between the sleeve and elbow is typically a full penetration butt weld. It will be appreciated that the weld joint lies within the confined space of the annulus and, as such, access to the weld joint is highly restricted. Moreover, the joint is subjected to the reactor environment and is subject to inter-granular stress corrosion cracking.

Over time, cracks may occur in the weld joint between the inner end of the thermal sleeve and the elbow end. In the event that one or more cracks are propagated, the integrity of the welded joint between the elbow and thermal sleeve can be severely compromised. Leakage flow through a cracked welded joint is not a particular concern in light of the fact that water lies about both the inside and outside of the joint. However, the recirculation system may be severely degraded if the thermal sleeve and elbow separate at the joint. Consequently, it is important that a gross separation of the elbow and thermal sleeve should be prevented even if cracks occur in the welded joint causing leakage flows.

BRIEF SUMMARY OF THE INVENTION

In accordance with a preferred embodiment of the present invention, a clamp assembly is provided for precluding separation of the elbow and thermal sleeve at the welded joint therebetween and which clamp assembly is installed in situ. The clamp assembly comprises a pair of clamp heads, each having a semi-cylindrical surface defining a recess. A plurality of pins project inwardly from the semi-cylindrical surface for reception in corresponding holes in the elbow and thermal sleeve. More particularly, first and second sets of pins are axially spaced one from the other on each semi-cylindrical surface. The pins of each set are circumferentially spaced one from the other. Additionally, the pins lie parallel to one another and extend in a direction parallel to a plane passing through the heads, i.e., the pins extend in a plane normal to a plane containing the axis of the thermal sleeve and intersecting joint surfaces of each head defining the ends of the semi-cylindrical recesses. Also, the pins extend progressively greater distances from the semi-cylindrical surface in an inward direction as the pins are spaced from an apex of the head toward opposite ends of the head. Holes are provided at corresponding circumferentially spaced locations about each of the elbow and sleeve ends and have parallel axes for receiving the pins. Once received about the elbow and sleeve with the pins in the holes, the clamp heads are secured to one another, preferably by bolts. In this manner, in the event of a failure of the weld joint, the elbow and sleeve will not separate from one another.

To install the clamp assembly in situ, fixtures mounting electrode discharge machining (EDM) actuators are lowered into the annular space to form the holes in the sleeve and elbow at the desired circumferentially spaced positions. Once the holes are formed, the clamp heads are lowered into the annular space such that the pins are received in the preformed holes in the elbow and sleeve. When received, the clamp heads are secured one to the other, preferably using remotely operated tools to bolt the heads together. Stabilizing pins also extend through one of the clamp heads and terminate in ends received in recesses of the opposite clamp head. The stabilized pins preclude relative sliding movement between the clamp heads, preventing relative rocking motion and prevent crushing the thermal sleeve.

In a preferred embodiment according to the present invention, there is provided a clamp assembly for preventing separation of a thermal sleeve penetrating a nuclear reactor pressure vessel wall and a jet pump riser elbow at a connection between one another, comprising a pair of clamp heads each having a generally semi-cylindrical surface defining a recess opening along one side thereof for disposition about confronting ends of the sleeve and the elbow adjacent the connection therebetween. Each head includes generally axially spaced first and second sets of clamping pins projecting inwardly from the semi-cylindrical recess and fasteners for clamping the heads to one another on diametrically opposite sides of and about the connection between the sleeve and elbow with the pins receivable in holes in respective sleeve and elbow ends for precluding separation of the sleeve and riser elbow should the connection therebetween fail.

In a further preferred embodiment according to the present invention, there is provided in a nuclear reactor having a reactor pressure vessel wall, a core shroud spaced inwardly of the reactor pressure vessel wall defining a generally annular space therebetween, a jet pump in the annular space for circulating water within the core, a thermal sleeve penetrating the reactor pressure vessel wall, an elbow welded at one end to one end of the thermal sleeve and coupled at an opposite end to an inlet riser for flowing water to the jet pump and a clamp assembly for preventing separation of the thermal sleeve and the elbow at the welded joint therebetween. The clamp assembly includes a pair of clamp heads each having a generally semi-cylindrical surface defining a recess opening along one side thereof for disposition about confronting ends of the sleeve and the elbow adjacent the welded joint therebetween. Each head includes generally axially spaced first and second sets of clamping pins projecting inwardly from the semi-cylindrical recess, and fasteners for clamping the heads to one another on diametrically opposite sides of and about the welded connection between the sleeve and elbow ends with the pins receivable in holes in the respective sleeve and elbow ends for precluding separation of the sleeve and riser elbow should the welded joint therebetween fail.

In a still further preferred embodiment according to the present invention, there is provided in a nuclear reactor having a reactor pressure vessel wall, a core shroud spaced inwardly of the reactor pressure vessel wall defining a generally annular space therebetween, a jet pump in the annular space for circulating water within the core, a thermal sleeve penetrating the reactor pressure vessel wall, and an elbow welded at one end to an end of the thermal sleeve and lying within the annular space, the thermal sleeve and the elbow being adapted for supplying water to the jet pump in the annular space, a method of installing a clamp assembly for preventing separation of the thermal sleeve and the elbow, comprising the steps of providing a pair of clamp heads each having a generally semi-cylindrical surface defining a recess opening along one side thereof for disposition about confronting ends of the sleeve and the elbow adjacent the connection therebetween, each head including generally axially spaced first and second sets of clamping pins projecting inwardly from the semi-cylindrical recess, forming in situ and in the annular space holes in the sleeve and the elbow at locations corresponding to the spacing of the pins about each of the clamp heads, applying in situ and in the annular space the heads to the opposite sides of the sleeve and elbow with the first and second sets of pins penetrating the holes in the sleeve and elbow, respectively and securing in situ and in the annular space the clamp heads to one another about the joint between the sleeve and the elbow with the first-and second sets of pins in the holes of the sleeve and the elbow, respectively, to preclude separation of the sleeve and elbow should the joint therebetween fail.

DETAILED DESCRIPTION OF THE INVENTION

Figure 1:
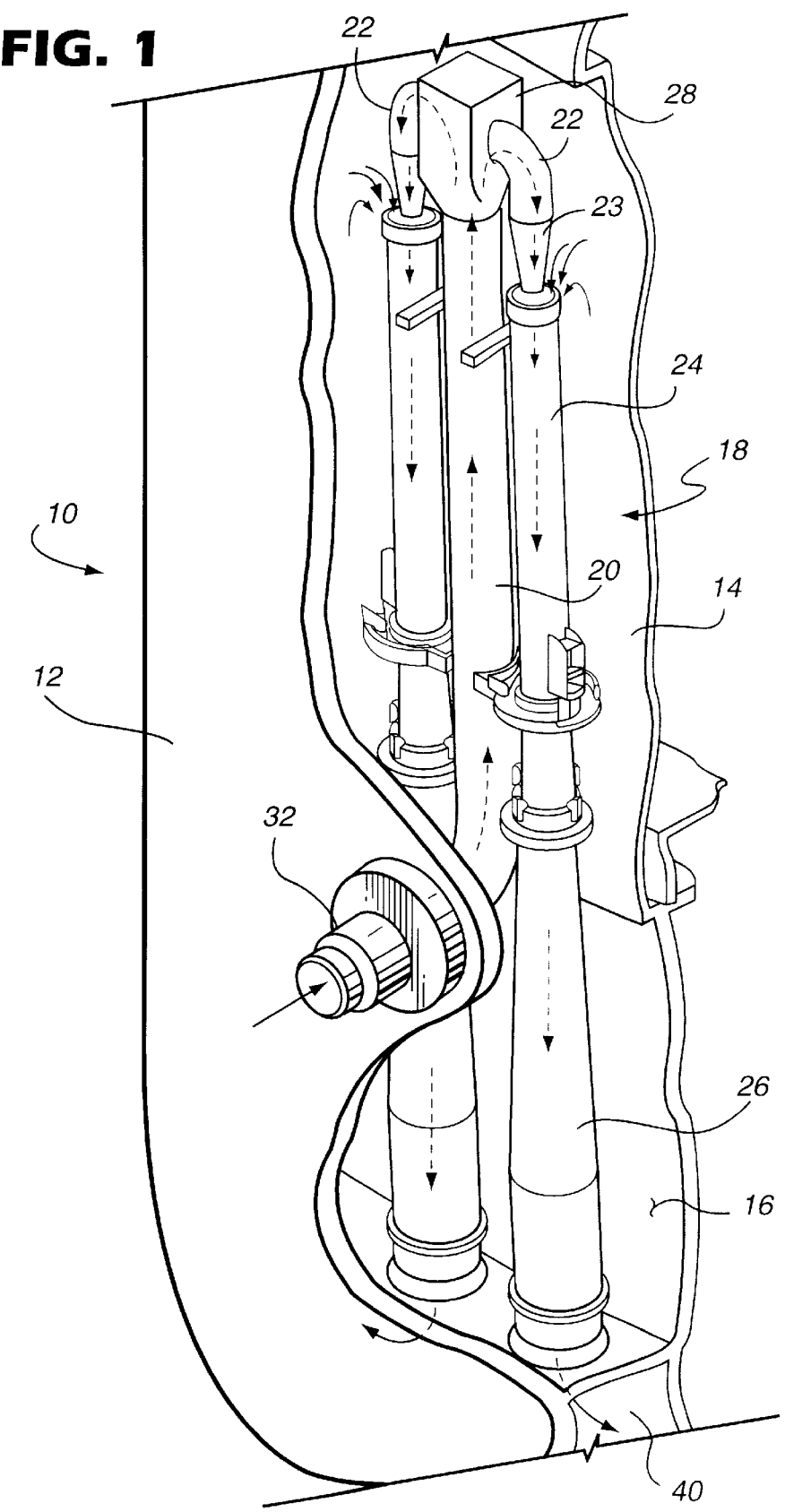
FIG. 1 is a fragmentary perspective view with portions broken out of a jet pump in an annular space between the inner shroud and the pressure vessel wall of a nuclear reactor.

Referring now to the drawings, particularly to FIG. 1, there is illustrated a reactor pressure vessel, generally designated 10, having a reactor pressure vessel wall 12 and an inner core shroud 14 defining a generally annular space 16 therebetween. As in a typical boiling water nuclear reactor, a plurality of jet pumps, one being generally designated 18, are disposed at circumferential spaced positions between the pressure vessel wall 12 and the core shroud 14 and in the annular space 16. Each jet pump 18 typically comprises an inlet riser 20, a pair of inlet elbows 22 adjacent the upper end of the inlet riser 20, a pair of nozzles 23, a pair of mixing assemblies 24 in communication with the respective inlet elbows 22 and a pair of diffusers 26. A holddown assembly 28 adjacent the top of the jet pump 18, together with a number of braces and restrainers maintain the jet pump in fixed position in the annular space 16 between the core shroud 14 and pressure vessel wall 12. A thermal sleeve 32 penetrates the pressure vessel wall 12 and is welded at its juncture 34 with an inlet elbow 36 (see FIG. 2). The opposite end of the inlet elbow 36 is secured to the lower end of the inset riser 20. It will be appreciated that the foregoing-described jet pump assembly is conventional in construction. Thus, water enters the thermal sleeve 32 and flows through the elbow 36, upwardly in the inlet riser 20, through the inlet elbows 22 into the jet pump nozzles 23 for flow in a downward direction through the mixing assembly 24, the diffusers 26 and into a plenum 40 for upward flow through the reactor core. As conventional, the jet pump nozzles 23 induce flow of water from the plenum into the mixing assemblies which mixes with the water passing through the jet pump nozzles.

Figure 2:
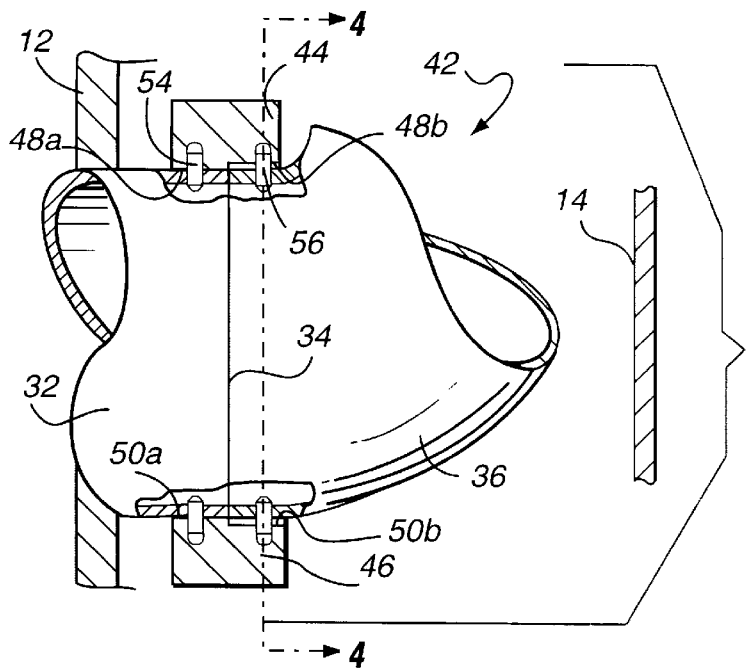
FIG. 2 is a fragmentary cross-sectional view illustrating the joint between a thermal sleeve and an elbow which forms part of the jet pump.
Figure 3:
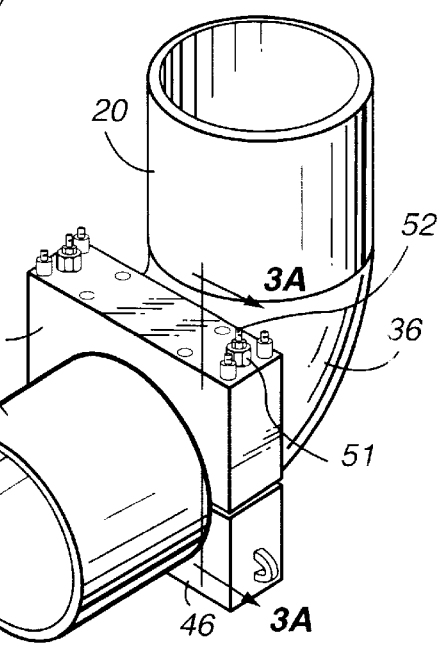
FIG. 3 is a perspective view of the thermal sleeve and elbow illustrating a clamp assembly for preventing separation of the thermal sleeve and elbow should the welded joint therebetween fail.

Referring now to FIGS. 2 and 3, it will be appreciated that the weld joint 34 between the thermal sleeve 32 and elbow 36 lies within the annular space 16 and which annular space is a confined area with limited access. To ensure that the thermal sleeve 32 and the elbow 36 do not physically separate from one another upon failure of the weld joint 34, a clamp assembly, generally designated 42, is provided in accordance with a preferred embodiment of the present invention. The clamp assembly 42 includes a pair of heads 44 and 46, each having a stepped semi-cylindrical recess 48 and 50, respectively (see FIG. 4). The recesses 48 and 50 of the upper and lower heads 44 and 46, respectively, are configured to fit about the upper and lower semi-cylindrical portions of the joint between the thermal sleeve 32 and elbow 36. Preferably, the radially smaller spaced recesses 48a and 50a engage about sleeve 32 while the radially enlarged recesses 48b and 50b are spaced radially outwardly from the end of elbow 36 as illustrated in FIG. 2. Theoretically, there is no gap between the cylindrical thermal sleeve and semi-circular recess of the respective mating heads that interface with the thermal sleeve. There are in fact spaces 48b and 50b to allow clearance between the heads 44 and 46 and the elbow (necessary due to lack of uniform shape of elbow). As illustrated in FIG. 3, the heads 44 and 46 have suitable openings for receiving bolts 52 and nuts 51 whereby the heads may be secured to one another about the joint 34 to prevent separation of the sleeve 32 and elbow 36 upon failure of the joint 34.

Figure 3A:
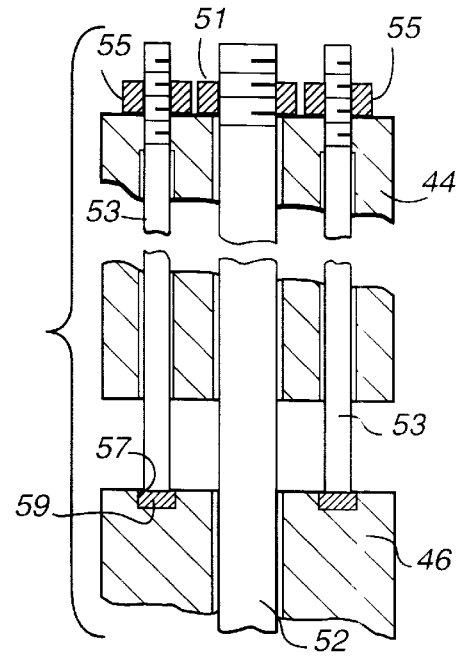
FIG. 3A is an enlarged cross-sectional view taken generally about on line 3A—3A in FIG. 3.

Referring to FIG. 3A, stabilizing pins 53 pass through bores in one of the clamp heads, e.g., head 44, and are threaded to the head 44. Lock nuts 55 are provided to secure the stabilizing pins 53 in plate on opposite sides of the bolts 52 and nuts 51. The ends of the stabilizing pins 53 engage in tightly toleranced recesses 57 formed 4n the registering face of the adjoining head, e.g., head 46. The stabilizing pins 53 immobilize the heads 44 and 46 relative to one another, thereby preventing the application of an excessive compressive load on the thermal sleeve and also ensuring proper alignment of heads 44 and 46 for passage of bolt 53 through said heads. The heads 44 and 46 must contact the thermal sleeve in order to prevent vibratory movement of the clamp assembly relative to the piping system.

Figure 4:
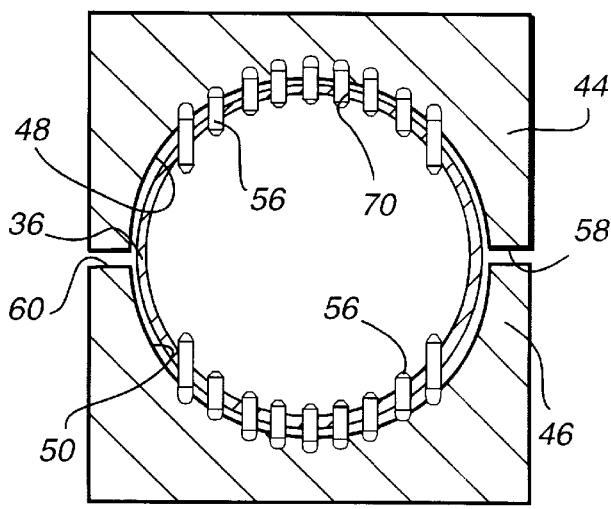
FIG. 4 is a cross-sectional view thereof taken generally about on line 4—4 in FIG. 2.

More particularly, first and second sets of clamping pins 54 and 56 are provided on each of the heads 44 and 46. The sets of pins 54 and 56 are axially spaced one from the other and project inwardly from the semi-cylindrical recess of each of the heads. As illustrated in FIG. 4, the pins 54 of the first and second sets thereof on each head are circumferentially spaced one from the other, similarly as are pins 56. Additionally, the pins lie generally parallel to one another and project from the surfaces of the respective stepped recesses varying distances, with the shortest distance lying at the apex of each semi-cylindrical surface and the distances progressively increasing toward the diametrical joint surfaces 58 and 60 of the heads 44 and 46, respectively. Thus, the pins have axes generally parallel to one another and extend normal to a diameter of the recess passing through the joint surfaces 58 and 60.

Figure 5:
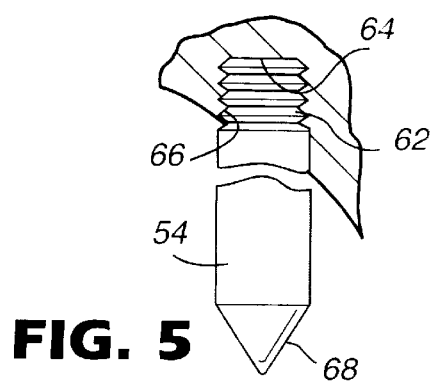
FIG. 5 is an enlarged fragmentary cross-sectional view illustrating a connection between a pin and a clamp head.
Figure 8:
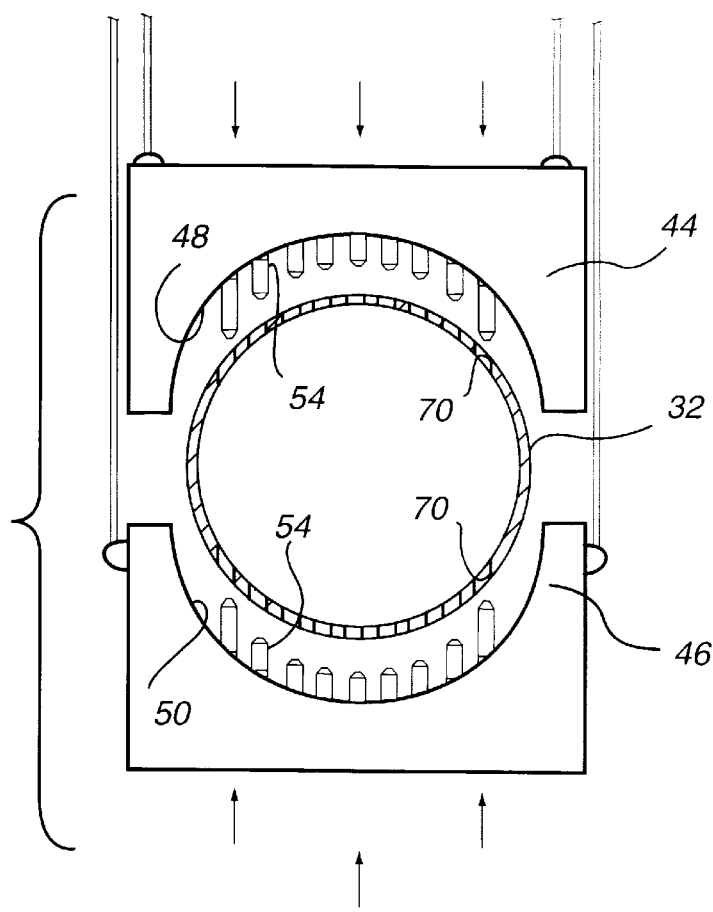
FIGS. 8 and 9 schematically illustrate the method of applying a clamp assembly about the joint of the thermal sleeve and the elbow.
Figure 9:
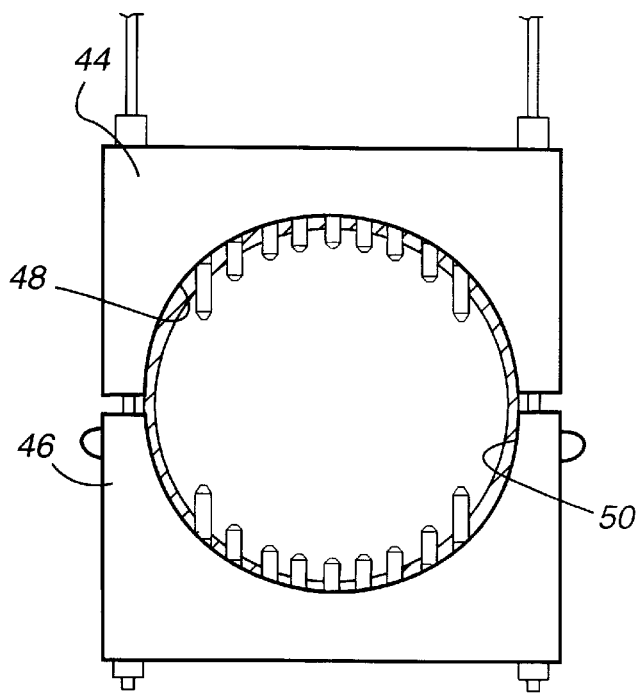

As illustrated in FIG. 5, each pin 54 and 56 has a male thread 62 adjacent one end and each aperture 64 in the respective heads has female threads 66. The projecting ends 68 of the pins are tapered to facilitate reception of the pins in holes in the thermal sleeve 32 and elbow 36. Referring to FIGS. 4 and 8, the preferred embodiment of the present invention provides a method for forming holes 70 at locations in both the thermal sleeve 32 and elbow 36 corresponding in location to the location of the pins 54 and 56. Thus, the holes are likewise configured to receive the pins. That is, the holes have axes lying generally parallel to one another, with the holes having different lengths from the apices of the heads to the joint surfaces. It will be appreciated that by clamping the heads 44 and 46 on opposite sides of the joint 34 between the thermal sleeve 32 and elbow 36 with the sets of pins 54 and 56, respectively, received in the holes 70 of the thermal sleeve 32 and elbow 36, the clamp assembly effectively precludes separation of the thermal sleeve and elbow from one another in the event that the joint 34 therebetween fails.

Figure 6:
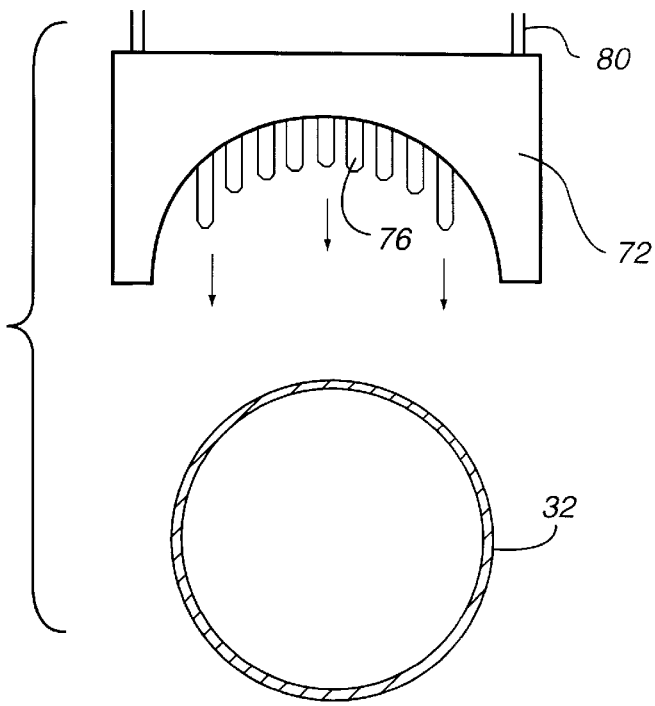
FIGS. 6 and 7 illustrate fixtures forming part of an EDM process for forming holes in the thermal sleeve and elbow.
Figure 7:
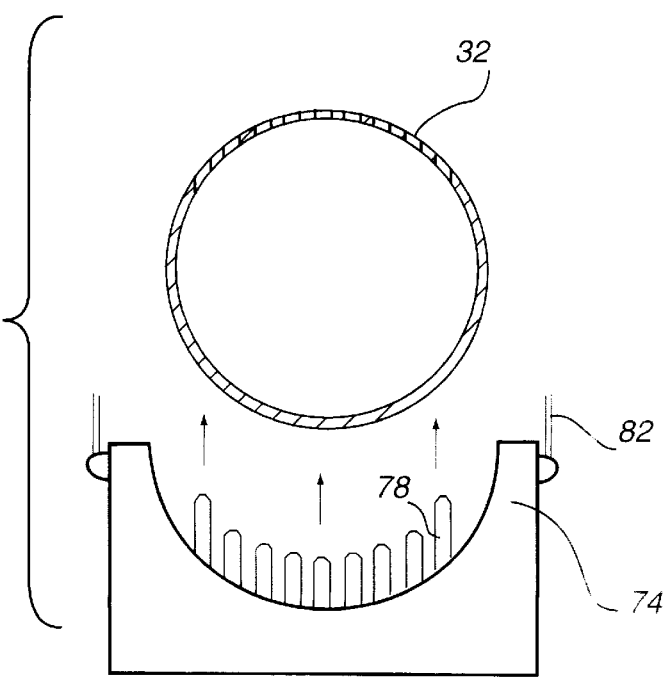

To apply the clamp assembly in situ in the annular space 16 between the core shroud 14 and pressure vessel wall 12 of the boiling water nuclear reactor, it is first necessary to form the holes 70 through the thermal sleeve and elbow. To accomplish this, a pair of actuators 72 and 74 (FIGS. 6 and 7) having EDM electrodes 76 and 78, respectively, are provided. Locating guides 80 and 82 are provided for lowering the fixtures 72 and 74 in the annular space about the joint 34 such that the electrodes, which correspond in location to the first and second sets of pins 54 and 56, are aligned with the thermal sleeve and elbow. As the heads 72 and 74 are brought together, the electrodes form the holes 70 in the thermal sleeve and elbow. Once the holes are formed, the fixtures 72 and 74 are removed, using the remote guides. Using similar remote guides, the heads 44 and 46 are lowered to lie on opposite sides of the joint 34, preferably above and below the joint. The pins 54 and 56 on the heads are received into the formed holes and the bolts 52 and nuts 51 are applied to clamp the heads about the joint. The ends of the stabilizing pins 53 bear on Inconel pads 59 which reside in recesses 57 to stabilize the clamp heads about the joint. Also, the stepped recesses 48b and 50b are spaced from the end of elbow 36. Thus, the heads 44 and 46 stand off the elbow end, thus avoiding clamping against high points on the elbow and introducing stresses therein.

It will be appreciated from a review of FIG. 2 that the sets of pins lie in holes on opposite sides of the joint 34. Consequently, should the weld joint 34 fail, the clamp assembly will maintain the thermal sleeve and elbow in their illustrated engaged relation. While leakage flow may occur due to failure of the weld joint, the leakage flow is not significant because water flows both on the outside and within the joint. The significant aspect is that the reactor is maintained as a floodable volume, thereby precluding a possible loss of coolant accident. The invention also provides a recirculation system which does not degrade due to the failure of the joint 34 to the extent that recirculating flow is significantly diminished.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A clamp assembly for preventing separation of a thermal sleeve penetrating a nuclear reactor pressure vessel wall and a jet pump riser elbow at a connection between one another, comprising:

a pair of clamp heads each having a generally semi-cylindrical surface defining a recess opening along one side thereof for disposition about confronting ends of the sleeve and the elbow adjacent the connection therebetween;

each said head including generally axially spaced first and second sets of clamping pins projecting inwardly from said semi-cylindrical recess; and fasteners for clamping the heads to one another on diametrically opposite sides of and about the connection between the sleeve and elbow with the pins receivable in holes in respective sleeve and elbow ends for precluding separation of the sleeve and riser elbow should the connection therebetween fail;

said pins having male threaded portions and said heads having female threaded apertures opening inwardly from said surface whereby said pins are threaded to said heads.

2. An assembly according to claim 1 wherein said pins on each head lie generally parallel to one another.

3. An assembly according to claim 1 wherein portions of said pins project inwardly varying distances from said surface of each head.

4. An assembly according to claim 3 wherein said pins on each head lie generally parallel to one another.

5. An assembly according to claim 1 wherein the pins of each of said first and second sets of pins on each head are circumferentially spaced from one another.

6. An assembly according to claim 1 wherein said fasteners comprise a bolt and nut on each of the opposite sides thereof for joining said heads to one another about the connection between the sleeve and elbow.

7. A joint assembly for a nuclear reactor pressure vessel comprising:

a thermal sleeve penetrating a wall of the nuclear reactor pressure vessel;

a jet pump riser elbow adjacent said wall, a clamp assembly for preventing separation of said thermal sleeve and said jet pump riser elbow at a connection between one another;

said clamp assembly including a pair of clamp heads each having a generally semi-cylindrical surface defining a recess opening along one side thereof for disposition about confronting ends of said sleeve and said elbow adjacent the connection therebetween;

each said head including generally axially spaced first and second sets of clamping pins projecting inwardly from said semi-cylindrical recess; and fasteners for clamping the heads to one another on diametrically opposite sides of and about the connection between said sleeve and said elbow;

each of said sleeve and said elbow having ends each having a circumferentially spaced array of holes spaced back from the connection therebetween, said holes being circumferentially spaced from one another about said heads;

said pins being received in said holes in the respective sleeve and elbow ends for precluding separation of said sleeve and said riser elbow should the connection therebetween fail.

8. An assembly according to claim 7 wherein each said head terminates along a pair of joint surfaces on diametrically opposite sides of said recess, said pins having axes generally parallel to one another and extending normal to a diameter of the recess passing through said joint surfaces, said holes through said sleeve and elbow having axes corresponding to the axes of said pins.

9. An assembly according to claim 8 wherein said pins and holes on said heads, and said sleeve and said elbow, respectively, extend parallel to one another when said heads are clamped about said sleeve and elbow.

10. An assembly according to claim 9 wherein said pins project progressively greater distances from said surfaces as the pins are distributed along the heads substantially midway between said joint surfaces and toward said joint surfaces.

11. An assembly according to claim 10 including stabilizing pins on opposite sides of said fasteners and extending through one of said heads and engaging against another of said heads to stabilize the heads relative to one another.

12. An assembly according to claim 7 wherein said pins on each head lie generally parallel to one another.

13. An assembly according to claim 7 wherein portions of said pins project inwardly varying distances from said surface of each head.

14. An assembly according to claim 13 wherein said pins on each head lie generally parallel to one another.

15. An assembly according to claim 7 wherein the pins of each of said first and second sets of pins on each head are circumferentially spaced from one another.

16. An assembly according to claim 7 wherein said pins have male threaded portions and said heads have female threaded apertures opening inwardly from said surface whereby said pins are threaded to said heads.

17. An assembly according to claim 7 wherein said fasteners comprise a bolt and nut on each of the opposite sides thereof for joining said heads to one another about the connection between the sleeve and elbow.

* * * * *

UNITED STATES PATENT AND TRADEMARK OFFICE
CERTIFICATE OF CORRECTION

PATENT NO. : 6,375,230 B1
DATED : April 23, 2002
INVENTOR(S) : Jensen et al.

It is certified that error appears in the above-identified patent and that said Letters Patent is hereby corrected as shown below:

<u>Title page,</u>
Item [57], ABSTRACT,
Line 13, delete "Thug" and insert -- Thus --.

<u>Column 4,</u>
Line 11, delete "inset" and insert -- inlet --;
Line 53, delete "plate" and insert -- place --; and
Line 55, delete "4n" and insert -- in --.

Signed and Sealed this

Twenty-eighth Day of January, 2003

JAMES E. ROGAN
*Director of the United States Patent and Trademark Office*